United States Patent
Ojima

(10) Patent No.: US 7,110,037 B2
(45) Date of Patent: Sep. 19, 2006

(54) AUTOMATIC FOCUS CONTROL BASED ON VOLTAGE, TEMPERATURE, AND POWER SUPPLY

(75) Inventor: Noriaki Ojima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1087 days.

(21) Appl. No.: 10/025,803

(22) Filed: Dec. 26, 2001

(65) Prior Publication Data

US 2002/0080260 A1  Jun. 27, 2002

(30) Foreign Application Priority Data

Dec. 27, 2000  (JP)  .............................. 2000-398876

(51) Int. Cl.
   *H04N 5/225*  (2006.01)
(52) U.S. Cl. ...................... 348/372; 348/345
(58) Field of Classification Search ................ 348/372, 348/345, 348, 220
   See application file for complete search history.

(56) References Cited

U.S. PATENT DOCUMENTS 5,614,983 A * 3/1997 Iwane et al. ................. 396/97
5,799,214 A * 8/1998 Iwane ......................... 396/135
5,831,945 A * 11/1998 Shinbori et al. .............. 369/19
6,292,256 B1 * 9/2001 Yoshida ..................... 356/3.04
6,812,965 B1 * 11/2004 Kijima et al. ............... 348/312

FOREIGN PATENT DOCUMENTS

| JP | 9-130649 | 5/1997 |
| JP | 2000-253303 | 9/2000 |

* cited by examiner

*Primary Examiner*—Ngoc-Yen Vu
*Assistant Examiner*—Gary C. Vieaux
(74) *Attorney, Agent, or Firm*—Oblon, Spivak, McClelland, Maier & Neustadt, P.C.

(57) ABSTRACT

A digital camera is provided with, a voltage detection unit for a driving power supply, a temperature detection unit which detects an inner temperature and an outer temperature of the apparatus, a power supply detection unit which detects whether the power supply is an AC power supply or a DC power supply (battery), a power-supply condition control unit which makes a determination as to a power-supply state of the apparatus based upon a voltage, a temperature and the kind of the power supply that have been respectively detected by the respective detection and monitoring unit; and a focusing unit which automatically focuses a focus lens system onto a subject, and in this arrangement, the gap of automatic focusing timing is varied by an output from the power-supply condition control unit.

17 Claims, 2 Drawing Sheets

AUTOMATIC FOCUS CONTROL BASED ON VOLTAGE, TEMPERATURE, AND POWER SUPPLY

FIELD OF THE INVENTION

The present invention relates to an electronic apparatus such as a digital camera that is driven by a battery, and more particularly relates to an electronic apparatus provided with an automatic focusing device, a focusing position detection device, etc., for detecting a focusing position by using an external AF (auto-focusing process) or a CCD-AF (auto-focusing process by using a CCD).

BACKGROUND OF THE INVENTION

In recent years, digital cameras have been developed greatly, and widely used, and various types of them have been supplied to the market. An electronic apparatus such as a digital camera is generally driven by a battery (such as a galvanic cell) from the viewpoint of portable property and mobile property, and in the case of an electronic apparatus driven by a battery, a voltage drop due to the use of the apparatus makes the apparatus operation unstable, therefore, an arrangement has been proposed in which, at the time of a drop of voltage, a voltage-drop display is given (Japanese Patent Application Laid-Open (JP-A) No. 9-130649), or another arrangement has been proposed in which, in the case when a battery has been consumed, a function for allowing the user to see how many more image-pickup operations are available (JP-A No. 2000-253303).

The battery of a digital camera is mainly consumed by displaying images during an image-pickup processor picked-up images on a monitor or flashing process or storing process of images in media such as memories. Moreover, in almost all digital cameras, the focusing operation control is carried out by auto-focusing, and power consumed by motor driving, etc., of the auto-focusing device is not negligible.

Here, in the method disclosed by JP-A No. 2000-253303, in order to consume a battery effectively with high operability while prolonging the battery life, there have been proposed a unit which determines the availability of a reproduction mode for displaying a picked-up image on the monitor or a flashing operation and a unit which inhibits the use of an auto-focusing unit in the case of a drop in voltage.

However, in the above-mentioned conventional art, when the battery voltage drops to a predetermined voltage, the auto-focusing operation suddenly becomes in-operative, causing the user difficulty in handling, and only the battery voltage forms a factor for determining the use of the auto-focusing unit, and no consideration is given to a case in which, in a cold place, the battery voltage suddenly drops due to degradation in the battery performance or a case in which an AC adapter that is not susceptible to a drop of power-supply voltage. Furthermore, the user is not allowed to switch the automatic focusing operation, and no consideration is given to a case when the user desires to increase the processing speed rather than saving the battery.

SUMMARY OF THE INVENTION

It is a object of the present invention to provide a digital camera and an electronic apparatus having an automatic focusing device that are well-balanced in power consumption and operability.

A first aspect of the present invention provides a digital camera which has a control unit which regularly carries out an automatic focusing operation without a release button on an operation section being pressed, and this digital camera comprises, a voltage detection unit for a driving power supply, a temperature detection unit which detects an inner temperature and an outer temperature of the apparatus, a power supply detection unit which detects whether the power supply is an AC power supply or a DC power supply, a power-supply condition control unit which makes a determination as to a power-supply state of the apparatus based upon a voltage, a temperature and the kind of the power supply that have been respectively detected by these detection and monitoring unit, and a focusing unit which automatically focuses a focus lens system onto a subject, and in this arrangement, the gap of automatic focusing timing is varied by an output from the power-supply condition control unit.

As the gap of automatic focusing timing becomes shorter, the possibility of less amount of variation in the distance between a subject and the camera becomes higher, therefore, it is possible to shorten the time required for the focusing operation, and consequently to improve the operability. In this case, however, more power is required since the focusing unit is frequently driven, and the power voltage tends to drop instantaneously due to a peak current caused by the focusing operation, causing the possibility of an in-operative state in the camera. Therefore, based upon the voltage, inner and outer temperatures of the apparatus and the kind of power-supply detected by the respective detection unit, the power-supply condition is determined so that the gap of automatic focusing timing is varied, thus, both of the battery life and the operability are improved.

Moreover, a second aspect of the present invention provides the digital camera according to the first aspect, wherein the power supply condition control unit varies the gap of automatic focusing timing based upon the detected voltage.

A third aspect of the present invention provides the digital camera according to the second aspect, wherein the power supply condition control unit allows the user to select the permission and inhibition of the function for varying the gap of automatic focusing timing based upon the detected voltage. According to this aspect, only when the user permits the controlling operation for regularly varying the gap of automatic focusing processes based upon the power-supply voltage, the gap of automatic focusing processes is regularly varied.

Further, a fourth aspect of the present invention provides the digital camera according to the first aspect, wherein upon detection that the applied power supply is an AC power supply, the power-supply condition control unit carries out no detection of the power supply voltage so that the gap of automatic focusing timing is not varied. According to this aspect, in the case of the application of an AC power supply, no controlling operation for regularly varying the gap of automatic focusing processes is carried out, thereby making it possible to improve the operability.

Moreover, a fifth aspect of the present invention provides the digital camera according to the first aspect, wherein the power a supply condition control unit varies the gap of automatic focusing timing based upon the detected outer temperature. According to this aspect, the gap of automatic focusing processes is regularly varied based upon temperatures.

Furthermore, a sixth aspect of the present invention provides the digital camera according to the fifth aspect, wherein the power supply condition control unit allows the user to select the permission and inhibition of the function for varying the gap of automatic focusing timing based upon the detected outer temperature. According to this aspect, only when the user permits the controlling operation for regularly varying the gap of automatic focusing processes based upon the temperature, the gap of automatic focusing processes is regularly varied.

Here, a seventh aspect of the present invention provides the digital camera according to the first aspect, wherein the user is allowed to set the rate of variation in the gap of automatic focusing timing. According to this aspect, the user can set the rate of variation in the gap of regular automatic focusing processes.

Further, an eighth aspect of the present invention provides the digital camera according to the first aspect, wherein the automatic focusing unit detects a focusing position by driving the focusing lens system. According to this aspect, the control unit which regularly carries out auto-focusing processes is allowed to detect a focusing position by driving the focusing lens system.

Moreover, a ninth aspect of the present invention provides the digital camera according to the first aspect, wherein the automatic focusing unit determines a focusing position through a passive ranging method using a trigonometrical survey without driving the focusing lens system. According to this aspect, the control unit which regularly carries out auto-focusing processes has a passive ranging system using a trigonometrical survey.

A tenth aspect of the present invention provides the digital camera according to the first aspect, wherein the automatic focusing unit determines a focusing position through an active ranging method using a trigonometrical survey without driving the focusing lens system. According to this aspect, the control unit which regularly carries out auto-focusing processes has an active ranging system using a trigonometrical survey.

An eleventh aspect of the present invention provides a digital camera, comprising, a voltage detection unit for a driving power supply, a temperature detection unit which detects an inner temperature and an outer temperature of the apparatus, a power supply detection unit which detects whether the power supply is an AC power supply or a DC power supply (battery, a power-supply condition control unit which makes a determination as to a power-supply state of the apparatus based upon a voltage, a temperature and the kind of the power supply that have been respectively detected by the respective detection and monitoring unit, a focusing unit which automatically focuses a focus lens system onto a subject, and a focusing position detection unit which, when a release button is pressed, is allowed to acquire an evaluation value in synchronism with a VD signal to detect a focusing position, and in this arrangement, the focal position detection unit acquires the evaluation value by varying the gap of VD signals based upon the output of the power-supply condition control unit.

In the focusing unit which detects a focusing position by acquiring an evaluation value in synchronism with the VD signal, as the gap of VD signals becomes shorter, it becomes possible to detect the focusing position more quickly, however, the shortened gap of VD signals causes a greater current flowing through the image-pickup circuit, resulting in a short service life of the battery.

According to the above aspect, the power-supply state is determined based upon a voltage, outer and inner temperatures of the apparatus and the kind of the power supply that have been respectively detected by the respective detection unit so that the gap of VD signals is varied to acquire the evaluation value, thus, it becomes possible to improve both of the service life of the battery and the operability.

Moreover, a twelfth aspect of the present invention provides the digital camera according to the eleventh aspect, wherein the power supply condition control unit varies the gap of VD signals based upon the detected voltage. According to this aspect, the gap of VD signals is varied based upon the voltage of the power supply to obtain an evaluation value.

Furthermore, a thirteenth aspect of the present invention provides the digital camera according to the twelfth aspect, wherein the power supply condition control unit allows the user to select the permission and inhibition of the function for acquiring the evaluation value by varying the gap of VD signals based upon the detected voltage. According to this aspect, only when the user permits the control operation for acquiring the evaluation value by varying the gap of VD signals based upon the detected voltage, the gap of VD signals is varied to acquire the evaluation value.

A fourteenth aspect of the present invention provides the digital camera according to the eleventh aspect, wherein upon detection that the applied power supply is an AC power supply, the power-supply condition control unit carries out no detection of the voltage so that the gap of VD signals is not varied. According to this aspect, in the case of an AC power supply, no controlling operation for varying the gap of VD signals to acquire the evaluation value is carried out.

Moreover, a fifteenth aspect of the present invention provides the digital camera according to the eleventh aspect, wherein the power supply condition control unit varies the gap of VD signals based upon the detected outer temperature. According to this aspect, the gap of VD signals is varied based upon the temperature to obtain an evaluation value.

Furthermore, a sixteenth aspect of the present invention provides the digital camera according to the fifteen aspect, wherein the power supply condition control unit allows the user to select the permission and inhibition of the function for varying the gap of VD signals based upon the detected inner and outer temperatures. According to this aspect, only when the user permits the control operation for acquiring the evaluation value by varying the gap of VD signals based upon the temperature, the gap of VD signals is varied to acquire the evaluation value.

A seventeenth aspect of the present invention provides the digital camera according to the eleventh aspect, wherein the user is allowed to set the rate of variation in the gap of VD signals. According to this aspect, the user can set the rate of variation in the gap of VD signals that is used when the gap of VD signals is varied to acquire the evaluation value.

Other objects and features of this invention will become understood from the following description with reference to the accompanying drawings.

DETAILED DESCRIPTIONS

Referring to attached drawings, the following description will discuss one preferred embodiment of a digital camera according to the present invention.

Figure 1:
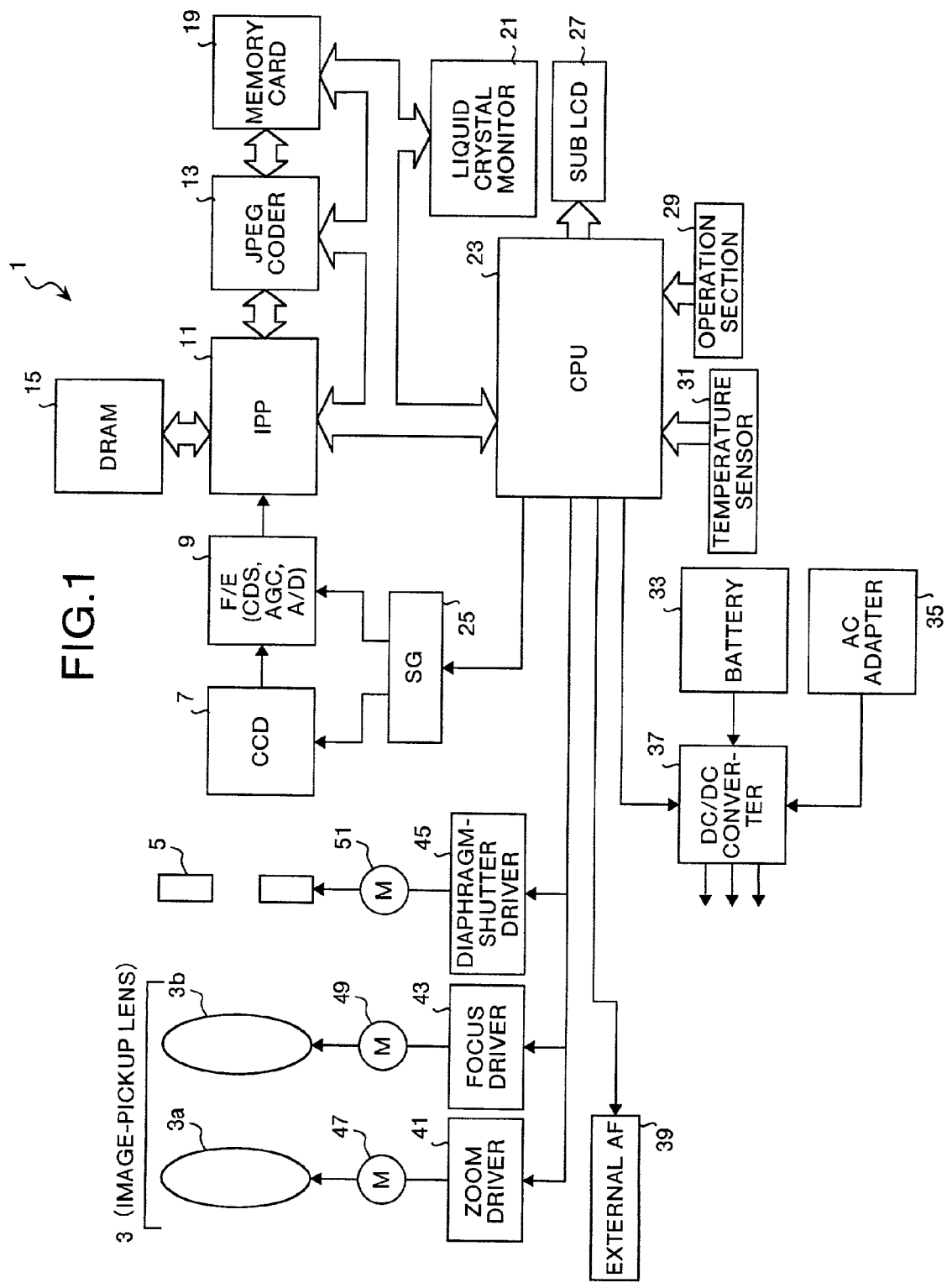
FIG. 1 is a block diagram that shows a construction of a digital camera according to the present invention.

FIG. 1 is a block diagram that shows a digital camera according to the present invention, and reference numeral 1 represents a digital camera. This digital camera 1 is constituted by a mechanism 5 having an image-pickup lens 3 and a shutter, a pre-processing unit (F/E) 9 having a CCD 7, a CDS circuit, a variable gain amplifier (AGC), an A/D converter, etc., an IPP (Image Pre-Processor) 11 serving as a digital signal processing unit, a JPEG coder 13, a DRAM 15, a memory card 19, a liquid crystal monitor 21 serving as a display unit, a CPU 23, a control signal generation section (SG) 25, a sub LCD 27, an operation section 29, a temperature sensor 31 for detecting the inner and outer temperatures of the inside of the digital camera apparatus, a battery 33, an AC adopter 35, a DC/DC converter 37, and an external AF mechanism 39.

The lens unit includes a zooming lens 3a, focusing lens 3b and the mechanism 5, and these are respectively driven by a zoom driver 41, a focus driver 43, a diaphragm-shutter driver 45 and pulse motors 47, 49 and 51. In other words, the zoom driver 43 drives the pulse motor 47, and shifts the zooming lens 3a by control signals supplied from the CPU 23, and the focus driver 43 also drives the pulse motor 49, and shifts the zooming lens 3a by control signals supplied from the CPU 23. Moreover, the diaphragm-shutter driver 45 also drives the pulse motor 51, and drives the mechanism such as the diaphragm, by control signals supplied from the CPU 23. Here, the image-pickup lens 3, the mechanism 5, the respective drivers 41 to 45 and motors 47 to 51, the CCD 7, etc. and the CPU 23, which will be described later, are allowed to constitute an automatic focusing unit. Moreover, upon carrying out the auto-focusing operation, a method for driving the focusing lens 3b to detect a focusing position or another passive ranging or active ranging method in which a trigonometrical survey is used without driving the focusing lens system may be applied.

The CCD 7 converts an image inputted through the lens unit to an analog electric signal, and the F/E 9 in the following state carries out a noise removing process, a level correcting process, a digital converting process, etc. on the image data picked up by the CCD image-pickup elements. The IPP 11 and the JPEG coder 13 carry out various processes and data processing operations for correction and for image compressing/decompression on the digital image inputted from the F/E 9 in a separated manner on its color difference and luminance, and the IPP 11 also outputs a vertical synchronous signal (VD signal), etc. to the CPU 23. The CPU 23 controls various operations of the digital camera in accordance with programs stored in the ROM, and functions as a power-supply condition control unit, and also carries out functions as a control unit which controls an automatic focusing operation. Moreover, the CPU 23 detects a voltage of a battery 33 and a voltage of the power supply that is supplied from an AC adapter (a voltage detection unit), and also determines whether the driving power supply is an AC power supply or a DC power supply (battery) (power-supply detection unit). Moreover, the CPU 23 also serves as a focusing position detection unit which, upon depression of a release button (shutter button) placed in the operation section 29, detects a focusing position in synchronism with the VD signal supplied by the IPP 11.

The signal generation section (SG) 25 generates clock signals required for the processes in the CCD 7 and F/E 9 based upon a control signal supplied from the CPU 23, and a temperature sensor 31, which detects the inner temperature and outer temperature of the apparatus, constitutes a temperature detection unit in cooperation with the CPU 23.

Figure 2:
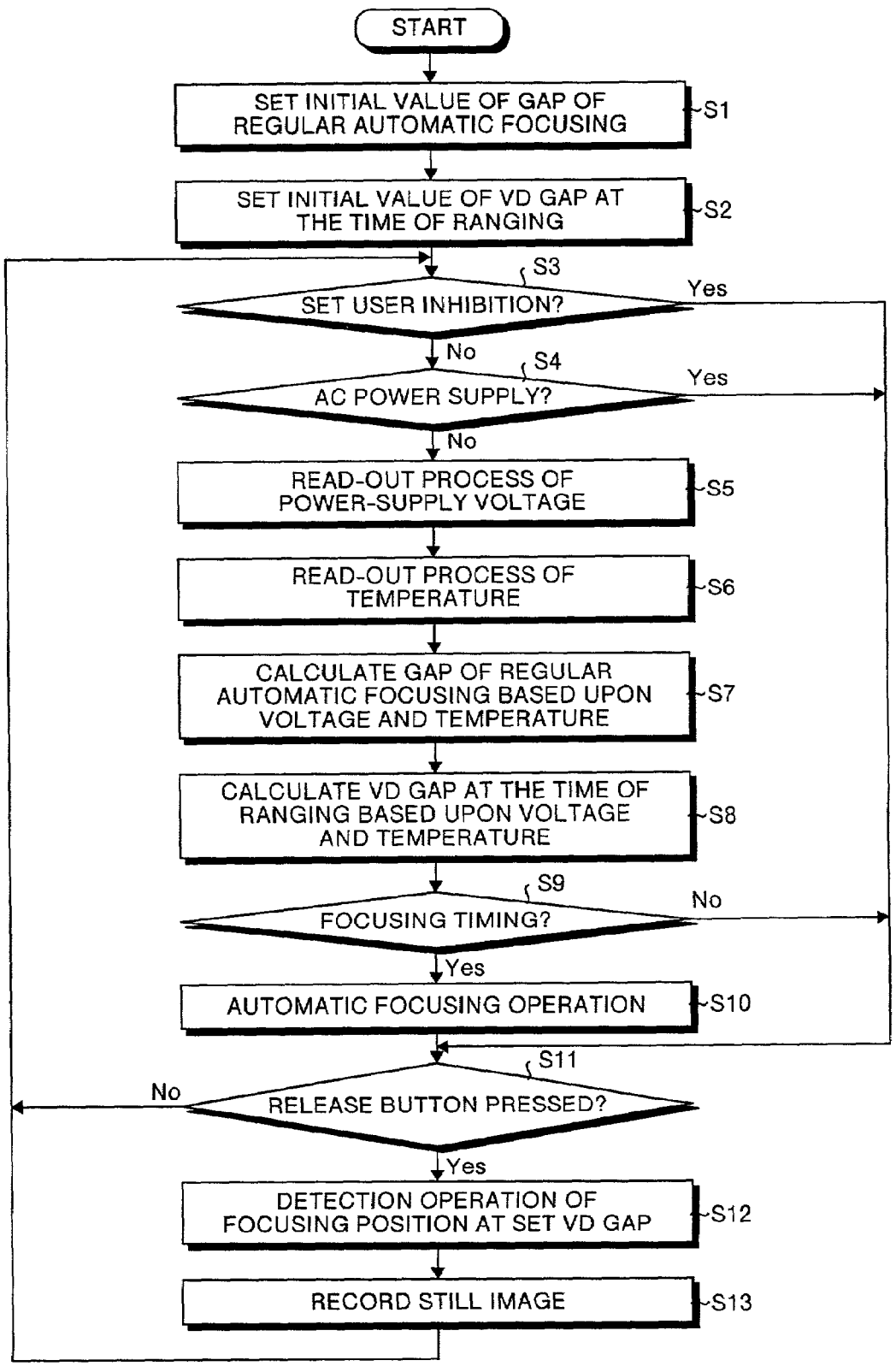
FIG. 2 is a flow chart that shows the operation of the digital camera according to the present invention.

Referring to a flow chart shown in FIG. 2, an explanation will be given of the operation of the digital camera having the above-mentioned arrangement.

First, the initial value of the regular gap of automatic focusing timing and the initial value of the gap of the generation timing of VD signals at the time of the focusing position detecting operation are set (step S1, step S2). These initial values are set to values that allow high-speed operations of the digital camera 1 with a sufficient power-supply voltage.

Next, it is determined whether or not the user inhibits the operation for varying the gap of automatic focusing timing and the operation for acquiring an evaluation value for detecting a focusing position by varying the gap of VD signals (step S3), based upon the power-supply condition, and if not inhibited (Yes at step S3), it is determined whether or not the driving power-supply of the digital camera is an AC power supply (step S4).

If it is not an AC power supply, that is, if the digital camera is driven by a battery such as a galvanic cell, the CPU 23 carries out a read-out process of a power-supply voltage (step S5) and a read-out process of a temperature (step S6), and based upon the detected voltage and temperature, it calculates the regular gap of automatic focusing timing (step S7), and also calculates and sets the VD gap that forms timing in which the evaluation value for detecting a focusing position by varying the gap of VD signals (step S8). Here, upon calculations of the automatic focusing timing gap and the VD gap, it is possible to set these to optimal values depending on the situations (power-supply voltage, temperature, etc.). For example, the respective gaps may be set so as to vary linearly in accordance with the power-supply voltage level and the temperature, or may be set in a step-like manner in accordance with the conditions such as the detected power-supply voltage, etc.

Thereafter, it is determined whether or not the focusing timing calculated and set at step S7 has been reached (step S9), and when the focusing timing has been reached, the automatic focusing operation for adjusting the focal point on a desired subject by driving the lens unit, etc. is carried out (step S10), and it is determined whether or not the release button on the operation section 29 has been pressed (step S11), and if the user has pressed the release button so as to pick up an image (Yes at step S11), the focusing position detection operation is carried out by using the VD gap set at step S8 (step S12), thereby picking up a still image (step S13). Here, in the case when the user has not pressed the release button at step S11, the sequence returns to step S3.

In contrast, at step S3, in the case when the user inhibits the alteration of the automatic focusing timing gap and the alteration of the VD signal gap (No at step S3), or when an AC power supply is used (Yes at step S4), neither the altering process of the automatic focusing timing gap nor the altering process of the VD signal gap is carried out (steps S4 to S10). Here, in the case when the user has not pressed the release button of the operation section 29, the sequence returns to step S3 where a user-setting determining process is carried out. In the case when the user has pressed the release button for picking up an image (Yes at step S11), the focusing position detecting operation is carried out with the set VD gap, that is, the VD gap that allows high-speed operations of the digital camera 1 with a sufficient power-supply voltage (step S12), thereby recording a still image (step S13). Thereafter, the sequence returns to the user setting determining process.

In other words, in the digital camera according to the present invention, it is possible to vary the automatic focusing timing gap and the VD signal gap in accordance with the kind of a driving power supply, the power-supply voltage value and the inner and outer temperatures of the apparatus, and the alteration of this setting can be inhibited by the user, or the alteration of the setting cannot be made in the case of the application of an AC power supply, therefore, it is possible to properly deal with a case in which the user desires to increase the processing speed rather than the power saving of the battery.

Here, the above-mentioned explanation has exemplified a case in which a digital camera is used, however, not limited to this, the present invention may be applied to any electronic apparatus that is capable of using an AC power supply and a DC power supply as a driving power supply and that is provided with an automatic focusing function. Moreover, the foregoing description has exemplified a case in which a digital camera provided with an AF function using a CCD, however, not limited to CCD-AF, the present invention may be applied to a digital camera and an electronic apparatus that externally receive an AF signal, such as a digital camera using an external AF 39, and provide the same effects with improved power consumption and operability in a well-balanced manner.

As described above, according to the first and second aspects of the present invention, a determination is made as to whether the driving power supply is an AC power supply or a DC power supply, and in the case when the DC power supply is used, the gap of the automatic focusing timing can be altered depending on the power supply voltage and the inner and outer temperatures of the apparatus, thus, even in case of the application at a cold place in which the battery voltage suddenly drops due to degradation in the battery performance, it is possible to maintain the power consumption and the operability in a well-balanced manner.

According to the third and sixth aspects of the present invention, the user is allowed to inhibit the alteration of the automatic focusing timing gap, therefore, this arrangement makes it possible to deal with a case in which the user desires to increase the processing speed rather than the power saving of the battery.

According to the fourth aspect of the present invention, in the case of an AC power supply of the driving power supply, the digital camera does not allow the gap of the automatic focusing timing to be altered, thereby making it possible to maintain superior operability.

According to the fifth aspect of the present invention, the gap of the automatic focusing timing can be altered depending on the outer temperature of an electronic apparatus such as a digital camera, thus, even in case of the application at a cold place in which the battery voltage suddenly drops due to degradation in the battery performance, it is possible to maintain the power consumption and the operability in a well-balanced manner.

According to the seventh aspect of the present invention, the user is allowed to set the rate of variation in the automatic focusing timing gap so that the balance between the power consumption and operability can be maintained as the user desires.

According to the eighth, ninth and tenth aspects of the present invention, a method in which the automatic focusing unit drives the focusing lens system or a passive ranging method or an active ranging method in which a trigonometrical survey is used without driving the focusing lens system is adopted, and a determination is made as to whether the driving power supply is an AC power supply or a DC power supply, and in the case of a DC power supply, the gap of the automatic focusing timing can be altered depending on the power supply voltage and the inner and outer temperatures of the apparatus, thus, even in case of the application at a cold place in which the battery voltage suddenly drops due to degradation in the battery performance, it is possible to maintain the power consumption and the operability in a well-balanced manner.

According to the eleventh aspect of the present invention, a determination is made as to whether the driving power supply is an AC power supply or a DC power supply, and in the case of a DC power supply, the gap of VD signals can be altered depending on the power supply voltage and the inner and outer temperatures of the apparatus so as to obtain an evaluation value for a focusing operation, thus, even in case of the application at a cold place in which the battery voltage suddenly drops due to degradation in the battery performance, it is possible to maintain the power consumption and the operability in a well-balanced manner.

According to the twelfth aspect of the present invention, a determination is made as to whether the driving power supply is an AC power supply or a DC power supply, and in the case of a DC power supply, the gap of VD signals can be altered depending on the power supply voltage so as to obtain an evaluation value for a focusing operation, thus, even in case of the application at a cold place in which the battery voltage suddenly drops due to degradation in the battery performance, it is possible to maintain the power consumption and the operability in a well-balanced manner.

According to the thirteenth and sixteenth aspects of the present invention, the user is allowed to inhibit the alteration of the gap of VD signals, therefore, this arrangement makes it possible to deal with a case in which the user desires to increase the processing speed rather than power saving of the battery.

According to the fourteenth aspect of the present invention, in the case when an AC power supply is used as the driving power supply, the digital camera does not allow the gap of VD signals to be altered, thereby making it possible to maintain superior operability.

According to the fifteenth aspect of the present invention, the gap of VD signals can be altered depending on the outer temperature of an electronic apparatus such as a digital camera, thus, even in case of the application at a cold place in which the battery voltage suddenly drops due to degradation in the battery performance, it is possible to maintain the power consumption and the operability in a well-balanced manner.

According to the seventeenth aspect of the present invention, the user is allowed to set the rate of variation in the gap of VD signals so that the balance between the power consumption and operability can be maintained as the user desires.

The present document incorporates by reference the entire contents of Japanese priority document, 2000-398876 filed in Japan on Dec. 27, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera, which has a control unit which regularly carries out an automatic focusing operation without a release button on an operation section being pressed, comprising:
a voltage detection unit which detects a voltage of a power supply;
a temperature detection unit which detects an inner temperature and an outer temperature of the digital camera;

a power supply detection unit which detects whether the power supply is an AC power supply or a DC power supply;

a power-supply condition control unit which makes a determination as to a power-supply state of the digital camera based upon a voltage, a temperature and the kind of the power supply that have been respectively detected by the voltage detection unit, the temperature detection unit, and the power supply detection unit; and a focusing unit which automatically focuses a focus lens system onto a subject, wherein the gap of automatic focusing timing is varied by an output from the power-supply condition control unit.

2. The digital camera according to claim 1, wherein the power supply condition control unit varies the gap of automatic focusing timing based upon the detected voltage.

3. The digital camera according to claim 2, wherein the power supply condition control unit grants permission and inhibition of the function for varying the gap of automatic focusing timing based upon the detected voltage in accordance with user input.

4. The digital camera according to claim 1, wherein upon detection that the applied power supply is an AC power supply, the power-supply condition control unit carries out no detection of the power supply voltage so that the gap of automatic focusing timing is not varied.

5. The digital camera according to claim 1, wherein the power supply condition control unit varies the gap of automatic focusing timing based upon the detected outer temperature.

6. The digital camera according to claim 5, wherein the power supply condition control unit grants permission and inhibition of the function for varying the gap of automatic focusing timing based upon the detected outer temperature in accordance with user input.

7. The digital camera according to claim 1, further comprising an input device configured to allow a user set the rate of variation in the gap of automatic focusing timing.

8. The digital camera according to claim 1, wherein the automatic focusing unit detects a focusing position by driving the focusing lens system.

9. The digital camera according to claim 1, wherein the automatic focusing unit determines a focusing position through a passive ranging method using a trigonometrical survey without driving the focusing lens system.

10. The digital camera according to claim 1, wherein the automatic focusing unit determines a focusing position through an active ranging method using a trigonometrical survey without driving the focusing lens system.

11. A digital camera comprising:

a voltage detection unit which detects a voltage of a power supply;

a temperature detection unit which detects an inner temperature and an outer temperature of the digital camera;

a power supply detection unit which detects whether the power supply is an AC power supply or a DC power supply;

a power-supply condition control unit which makes a determination as to a power-supply state of the digital camera based upon a voltage, a temperature and the kind of the power supply that have been respectively detected by the voltage detection unit, the temperature detection unit, and the power supply detection unit;

a focusing unit which automatically focuses a focus lens system onto a subject; and a focusing position detection unit which, when a release button is pressed, is allowed to acquire an evaluation value in synchronism with a VD signal (vertical synchronous signal) to detect a focusing position, wherein the focal position detection unit acquires the evaluation value by varying the gap of VD signals based upon the output of the power-supply condition control unit.

12. The digital camera according to claim 11, wherein the power supply condition control unit varies the gap of VD signals based upon the detected voltage.

13. The digital camera according to claim 12, wherein the power supply condition control unit grants permission and inhibition of the function for acquiring the evaluation value by varying the gap of VD signals based upon the detected voltage in accordance with user input.

14. The digital camera according to claim 11, wherein upon detection that the applied power supply is an AC power supply, the power-supply condition control unit carries out no detection of the voltage so that the gap of VD signals is not varied.

15. The digital camera according to claim 11, wherein the power supply condition control unit varies the gap of VD signals based upon the detected outer temperature.

16. The digital camera according to claim 15, wherein the power supply condition control unit grants permission and inhibition of the function for varying the gap of VD signals based upon the detected outer temperature in accordance with user input.

17. The digital camera according to claim 11, further comprising an input device configured to allow a user to set the rate of variation in said gap of VD signals.

* * * * *

UNITED STATES PATENT AND TRADEMARK OFFICE
CERTIFICATE OF CORRECTION

PATENT NO. : 7,110,037 B2 Page 1 of 1
APPLICATION NO. : 10/025803
DATED : September 19, 2006
INVENTOR(S) : Ojima It is certified that error appears in the above-identified patent and that said Letters Patent is hereby corrected as shown below:

On the title page, Item (54), and Column 1, the Title information is incorrect. Item (54) and Column 1 should read:

-- (54) DIGITAL CAMERA HAVING AUTOMATIC FOCUS CONTROL BASED ON VOLTAGE, TEMPERATURE, AND POWER SUPPLY --

Signed and Sealed this

Twelfth Day of December, 2006

JON W. DUDAS
*Director of the United States Patent and Trademark Office*